US012489184B2

(12) United States Patent
Koizumi et al.

(10) Patent No.: US 12,489,184 B2
(45) Date of Patent: Dec. 2, 2025

(54) DC BLOCK AND PLASMA GENERATOR USING THE SAME

(71) Applicants: Pale Blue Inc., Chiba (JP); THE UNIVERSITY OF TOKYO, Tokyo (JP)

(72) Inventors: Hiroyuki Koizumi, Tokyo (JP); Yasuho Ataka, Tokyo (JP); Jun Asakawa, Chiba (JP); Kazuya Yaginuma, Chiba (JP); Yuichi Nakagawa, Chiba (JP); Kohei Shimamura, Ibaraki (JP); Sei Mizojiri, Kanagawa (JP)

(73) Assignees: Pale Blue Inc., Chiba (JP); THE UNIVERSITY OF TOKYO, Tokyo (JP)

( * ) Notice: Subject to any disclaimer, the term of this patent is extended or adjusted under 35 U.S.C. 154(b) by 172 days.

(21) Appl. No.: 18/550,333

(22) PCT Filed: Mar. 16, 2021

(86) PCT No.: PCT/JP2021/010520
§ 371 (c)(1),
(2) Date: Sep. 13, 2023

(87) PCT Pub. No.: WO2022/195700
PCT Pub. Date: Sep. 22, 2022

(65) Prior Publication Data

US 2024/0195037 A1 Jun. 13, 2024

(51) Int. Cl.
*H05H 1/46* (2006.01)
*H01P 1/20* (2006.01)
*H01Q 21/00* (2006.01)

(52) U.S. Cl.
CPC ....... *H01P 1/2007* (2013.01); *H01Q 21/0075* (2013.01); *H05H 1/4645* (2021.05); *H05H 1/466* (2021.05)

(58) Field of Classification Search
CPC ..... H01P 1/2007; H05H 1/4645; H05H 1/466
(Continued)

(56) References Cited

U.S. PATENT DOCUMENTS

2003/0214443 A1* 11/2003 Bauregger ............. H01Q 21/28 343/700 MS
2012/0200369 A1 8/2012 Jang et al.

FOREIGN PATENT DOCUMENTS

JP S6359101 A 3/1988
JP H09232822 A 9/1997
(Continued)

OTHER PUBLICATIONS

International Search Report and Written Opinion issued on May 25, 2021 for corresponding PCT Application No. PCT/JP2021/010520.
(Continued)

*Primary Examiner* — Rakesh B Patel
(74) *Attorney, Agent, or Firm* — POLSINELLI PC

(57) ABSTRACT

A configuration is provided in which two high-frequency power transmission antennas 111, 121 formed on two microstrip lines 101, 102, respectively, are disposed to face each other with an insulating sheet 103 interposed between the two high-frequency power, and the high-frequency power transmission antennas 111, 121 are formed on the two microstrip lines 101, 102, respectively, to realize transmission of high-frequency power, to make it possible to reduce the size of a DC block as compared with a conventional DC block using a coaxial line shape or a waveguide shape, and make it possible to highly efficiently transmit only high-frequency power while cutting off high-voltage direct-current power by the insulating sheet 103.

14 Claims, 8 Drawing Sheets

(58) Field of Classification Search
USPC ................. 333/99 PL, 181, 185; 156/345.36
See application file for complete search history.

(56) References Cited

FOREIGN PATENT DOCUMENTS

| | | | |
|---|---|---|---|
| JP | 2009162178 | A | 7/2009 |
| JP | 2009246810 | A | 10/2009 |
| WO | 2004034505 | A1 | 4/2004 |

OTHER PUBLICATIONS

Yasuho Ataka et al.; An experimental evaluation of an influence on mass utilization efficiency by changing a static magnetic field and electric potentials inside 1W-class water ion thruster; JSASS annual meeting 50; Apr. 18-19, 2019 (Abstract).

European Search Report issued on Dec. 16, 2024 for counterpart European Application No. 21931452.3.

Indranuj Dey et al.; "Development of a Low Power Multipole Confined Microwave Plasma Ion Thruster," Trans. ISASS Aerospace Tech. Japan. vol. 12, No. ists29, 2014, pp. Pb_7-Pb_I2.

* cited by examiner (a)

(b)

(a)

(b)

DC BLOCK AND PLASMA GENERATOR USING THE SAME

CROSS REFERENCE TO RELATED APPLICATIONS

This application is a National Phase filing under 35 U.S.C. § 371 of PCT/JP2021/010520, filed on Mar. 16, 2021. The entire contents of each application are hereby incorporated by reference.

TECHNICAL FIELD

The present invention relates to a DC block that transmits high-frequency power and cuts off direct-current power, and a plasma generator using the DC block.

BACKGROUND ART

Conventionally, a DC block is known as a device for preventing a direct current (DC) from flowing into a high-frequency signal, and is used in various technical fields. As an example, there is an application to spacecraft engines. Some types of spacecraft engines use electricity to discharge propellant, and are called electric propulsion rockets. A typical electric propulsion rocket has a discharge mechanism for ionizing a propellant to generate plasma and an acceleration mechanism for accelerating the plasma.

Here, it is necessary to send high-frequency power used in high-frequency discharge when plasma is generated, and high-voltage direct-current power necessary for acceleration of the generated plasma, to a plasma generation chamber which is a container for generating plasma. The device that interrupts the interference between the high-frequency power and the direct-current power is a DC block, is disposed on a transmission line of the high-frequency power, and transmits only the high-frequency power and interrupts the direct-current power. That is, a DC block is used as a device that separates high-frequency power for plasma generation and high-voltage direct-current power for plasma acceleration.

In addition, it is known that acceleration performance of plasma can be improved by applying a direct-current voltage to a plurality of wall surfaces in contact with plasma inside the plasma generation chamber (see, for example, Non Patent Literature 1). Non Patent Literature 1 discloses that particularly remarkable performance improvement is caused by applying a voltage to an antenna for oscillating high-frequency power inside a plasma generation chamber. As a method of applying a voltage to an antenna, a method is disclosed in which a T-shaped portion is provided in a microwave transmission path, only a core wire is taken out, and the voltage is applied.

Note that a high-frequency signal device is known in which two open ring-shaped resonators formed on different planes are disposed to face each other to enable direct-current power or a low-frequency signal to be transmitted, and the resonators are electromagnetically coupled to each other to enable a high-frequency signal to be transmitted (see, for example, Patent Literature 1). Patent Literature 1 also discloses that two resonators are disposed to face each other with a spacer plate made of an insulator interposed therebetween.

Patent Literature 1: JP 2009-246810 A

Non Patent Literature 1: "An experimental evaluation of an influence on mass utilization efficiency by changing a static magnetic field and electric potentials inside 1W-class water ion thruster" (Yasuho ATAKA, Yuichi NAKAGAWA, Hiroyuki KOIZUMI, Kimiya KOMURASAKI; Proceedings of the 50th JSASS Annual Meeting; Apr. 18 and 19, 2019)

SUMMARY OF INVENTION

Technical Problem

The DC block is often required for use of high-frequency power in technical fields on the ground other than spacecraft engines, but the application thereof is often limited to a combination of high-frequency low power (1 to 100 W) and a direct-current low voltage (1 to 100 V) or a combination of high-frequency high power (100 to 10000 W) and a direct-current high voltage (1 to 10 kV). In general, the latter DC block is a large device.

On the other hand, in a DC block used for an electric propulsion rocket that is space equipment, a combination of high-frequency low power (1 to 100 W) and a direct-current high voltage (1 to 10 kV) is required, and significant size reduction is required. In particular, in the case of application to a small spacecraft engine, significant size reduction is required. However, such high-frequency low power and a direct-current high voltage and ultra-small size has not been realized in a conventional DC block configured using a coaxial line shape or a waveguide shape.

In the case of a coaxial type DC block, the electrical coupling upstream and downstream of the coaxial line is capacitive. Therefore, it is necessary to overlap an outer conductor of an upstream-side coaxial line and an outer conductor of a downstream-side coaxial line with an insulator interposed therebetween, and also to overlap an upstream-side inner conductor and a downstream-side inner conductor with an insulator interposed therebetween. Furthermore, in order to efficiently transmit microwaves (electromagnetic waves), it is also necessary to adjust impedance to a predetermined value by designing the inner diameter of each conductor and the outer diameter of each conductor to have a predetermined ratio. In order to increase the withstand voltage under these restrictions, it is necessary to stack layers in a radial direction such as inner conductor upstream—insulation—inner conductor downstream—dielectric—outer conductor downstream—insulation—outer conductor upstream, and it is inevitable to increase the size of the device as the voltage increases.

On the other hand, in the case of a waveguide type DC block, since the electrical coupling is based on electromagnetic waves, it is not necessary to stack the layers as in the case of the coaxial type. Therefore, it can be said that insulation can be achieved by sandwiching one insulating sheet (or insulating plate) between the upstream and downstream waveguides, and it is suitable for a high withstand voltage. However, the minimum size of the waveguide is determined on the principle of passing microwaves inside. For example, when a microwave of 4 to 5 GHz is passed, the minimum size is 48 mm×22 mm. Therefore, there is a clear lower limit to size reduction.

The present invention has been made to solve such a problem, and an object of the present invention is to provide a reduced-size DC block compatible with a combination of high-frequency low power and a direct-current high voltage.

Solution to Problem

In order to solve the above problem, a DC block of the present invention has a configuration in which two high-frequency power transmission antennas formed on two microstrip lines, respectively, are disposed to face each other with an insulating sheet interposed between the two high-frequency power transmission antennas.

Advantageous Effects of Invention

According to the present invention configured as described above, since the transmission of the high-frequency power is realized by forming the high-frequency power transmission antennas on the microstrip lines, it is not necessary to stack the layers as in the case of the coaxial type in order to increase the withstand voltage, and the minimum size is not limited on the principle of passing the microwaves as in the case of the waveguide type, and the size of the DC block can be reduced as compared with the conventional DC block using the coaxial line shape or the waveguide shape. In addition, it is possible to highly efficiently transmit only the high-frequency power while cutting off the high-voltage direct-current power by the insulating sheet sandwiched between the two high-frequency power transmission antennas. As a result, it is possible to provide the reduced-size DC block compatible with a combination of high-frequency low power and a direct-current high voltage.

DESCRIPTION OF EMBODIMENTS

Figure 1:
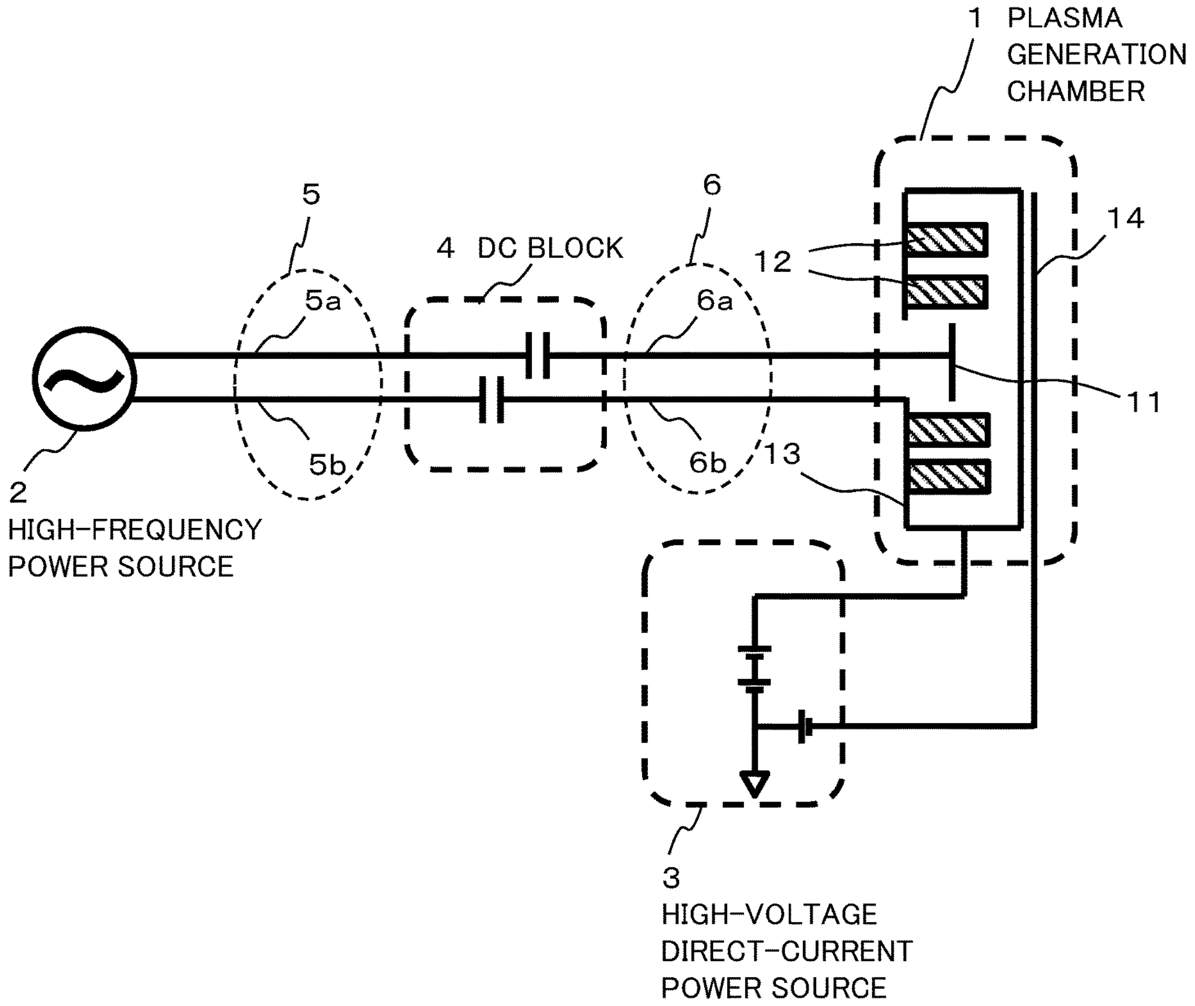
FIG. 1 is a diagram illustrating a configuration example of a plasma generator to which a DC block according to the present embodiment is applied.

Hereinafter, an embodiment of the present invention will be described with reference to the drawings. FIG. 1 is a diagram illustrating a configuration example of a plasma generator to which a DC block according to the present embodiment is applied. As illustrated in FIG. 1, the plasma generator according to the present embodiment includes a plasma generation chamber 1, a high-frequency power source 2, a high-voltage direct-current power source 3, and a DC block 4.

The plasma generation chamber 1 is a container for generating plasma by discharge using high-frequency power and for accelerating the generated plasma by high-voltage direct-current power. The plasma generation chamber 1 includes a plasma generation antenna 11, a plurality of magnets 12 disposed on a wall surface 13, and an accelerator grid 14. In the plasma generation chamber 1, a magnetic field is formed by the plurality of magnets 12, and plasma discharge is performed by introducing high-frequency waves such as microwaves from the plasma generation antenna 11. The generated plasma is accelerated by a screen grid for plasma discharge installed on a surface of the wall surface 13 facing the accelerator grid, and the accelerator grid 14.

The high-frequency power source 2 supplies high-frequency power for plasma generation to the plasma generation chamber 1. The high-frequency power source 2 and the plasma generation chamber 1 are connected by two coaxial lines 5, 6 via the DC block 4. The coaxial line 5 on the upstream side includes an inner conductor 5*a* and an outer conductor 5*b*, and the coaxial line 6 on the downstream side includes an inner conductor 6*a* and an outer conductor 6*b*. The inner conductor 6*a* of the downstream-side coaxial line 6 is connected to the plasma generation antenna 11. The outer conductor 6*b* of the downstream-side coaxial line 6 is connected to the magnets 12 via the wall surface 13 of the plasma generation chamber 1.

The high-voltage direct-current power source 3 supplies high-voltage direct-current power for plasma generation to the plasma generation chamber 1. The high-voltage direct-current power source 3 is connected to the wall surface 13 of the plasma generation chamber 1 and the accelerator grid 14. A high voltage exceeding 1 kV is applied between the wall surface 13 and the accelerator grid 14, and the plasma is accelerated and discharged by the potential difference, and is discharged toward an infinite potential (0 V) of the space.

The DC block 4 is disposed on coaxial lines 5, 6 which are transmission lines for transmitting high-frequency power to the plasma generation chamber 1, and transmits only the high-frequency power and cuts off the direct-current power. The configuration of the DC block 4 will be described in detail with reference to FIGS. 2 to 4.

Figure 2:
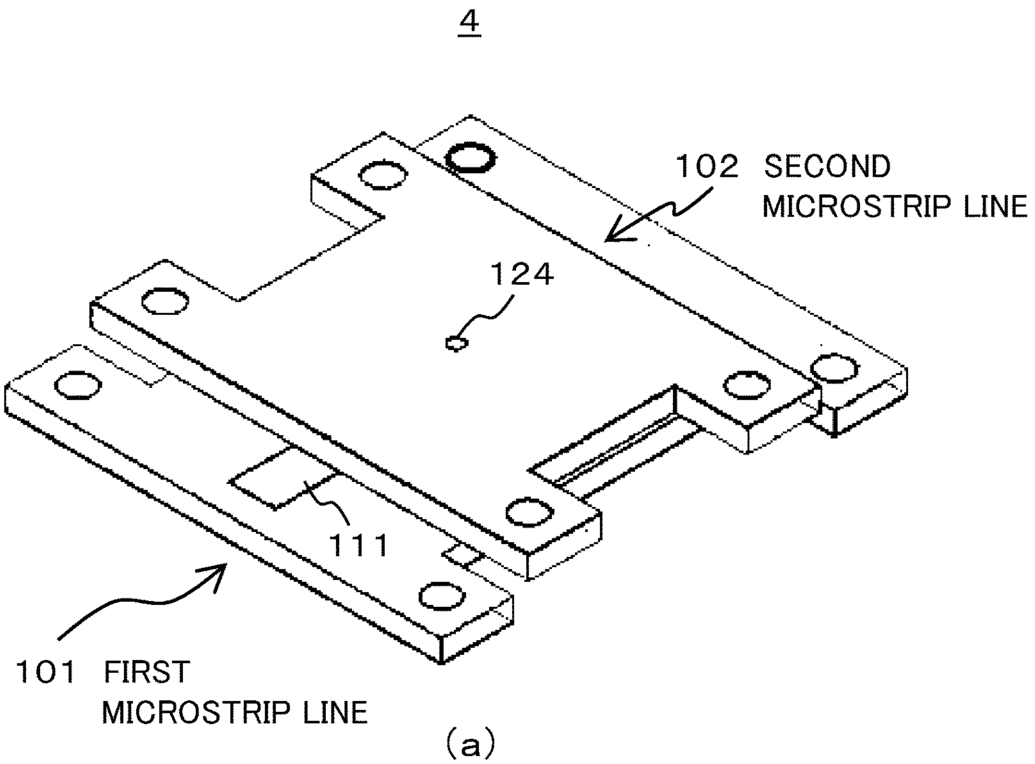
FIG. 2 is a diagram illustrating a configuration example of the DC block according to the present embodiment.
Figure 2:
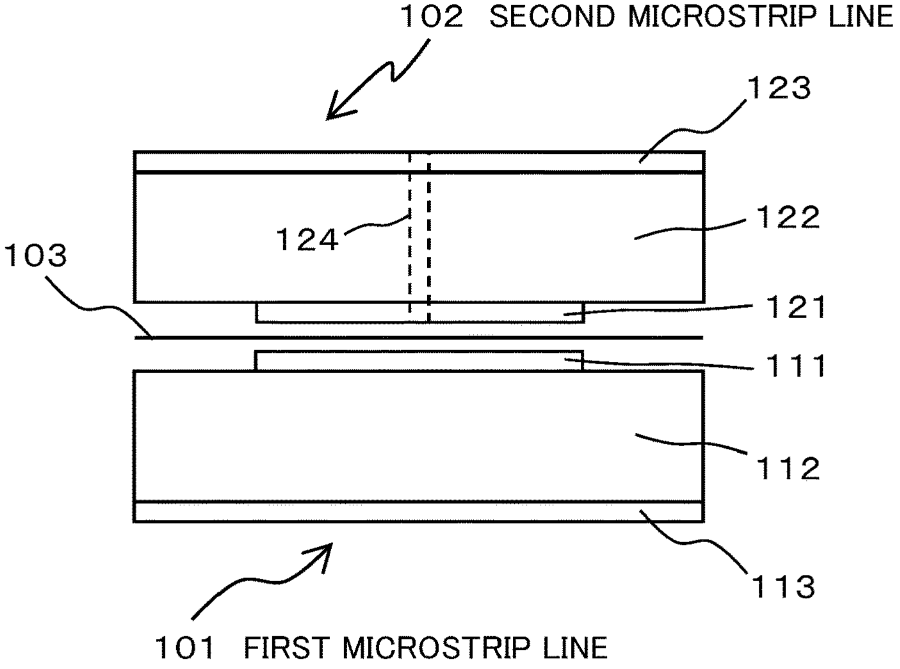

FIG. 2 is a diagram illustrating a configuration example of the DC block 4, in which FIG. 2 (*a*) is a perspective view and FIG. 2 (*b*) is a side view. FIG. 2 (*b*) is a schematic diagram of the layer structure, and does not accurately illustrate the thickness of each layer. As illustrated in FIG. 2, the DC block 4 of the present embodiment is configured by forming two high-frequency power transmission antennas 111, 121 on two microstrip lines 101, 102, respectively, and disposing the two high-frequency power transmission antennas 111, 121 to face each other with an insulating sheet 103 (not illustrated in FIG. 2 (*a*)) interposed therebetween.

As illustrated in FIG. 2 (*b*), the first microstrip line 101 has a layer structure including a wiring conductor layer in which the first high-frequency power transmission antenna 111 is formed, a ground conductor layer 113 in which the first high-frequency power transmission antenna 111 is not formed, and a dielectric layer 112 sandwiched between the wiring conductor layer and the ground conductor layer 113. In the present embodiment, the ground conductor layer 113 is formed on one plane of the dielectric layer 112. In addition, the first high-frequency power transmission antenna 111 is disposed on another plane of the dielectric layer 112, and the first high-frequency power transmission antenna 111 itself is a wiring conductor layer. In FIG. 2 (*a*), the first high-frequency power transmission antenna 111 appears not to protrude outward from the surface of the dielectric layer 112, but actually protrudes by the thickness of the first high-frequency power transmission antenna 111.

The second microstrip line 102 similarly has a layer structure including a wiring conductor layer in which the second high-frequency power transmission antenna 121 is formed, a ground conductor layer 123 in which the second high-frequency power transmission antenna 121 is not formed, and a dielectric layer 122 sandwiched between the wiring conductor layer and the ground conductor layer 123. The ground conductor layer 123 is formed on one plane of the dielectric layer 122 and the second high-frequency power transmission antenna 121 is disposed on another plane, and the second high-frequency power transmission antenna 121 itself is a wiring conductor layer.

The two microstrip lines 101, 102 are disposed to face each other such that the wiring conductor layers (high-frequency power transmission antennas 111, 121) face each other with the insulating sheet 103 interposed therebetween, and the ground conductor layers 113, 123 of the two microstrip lines 101, 102 are separated from the insulating sheet 103.

Figure 4:
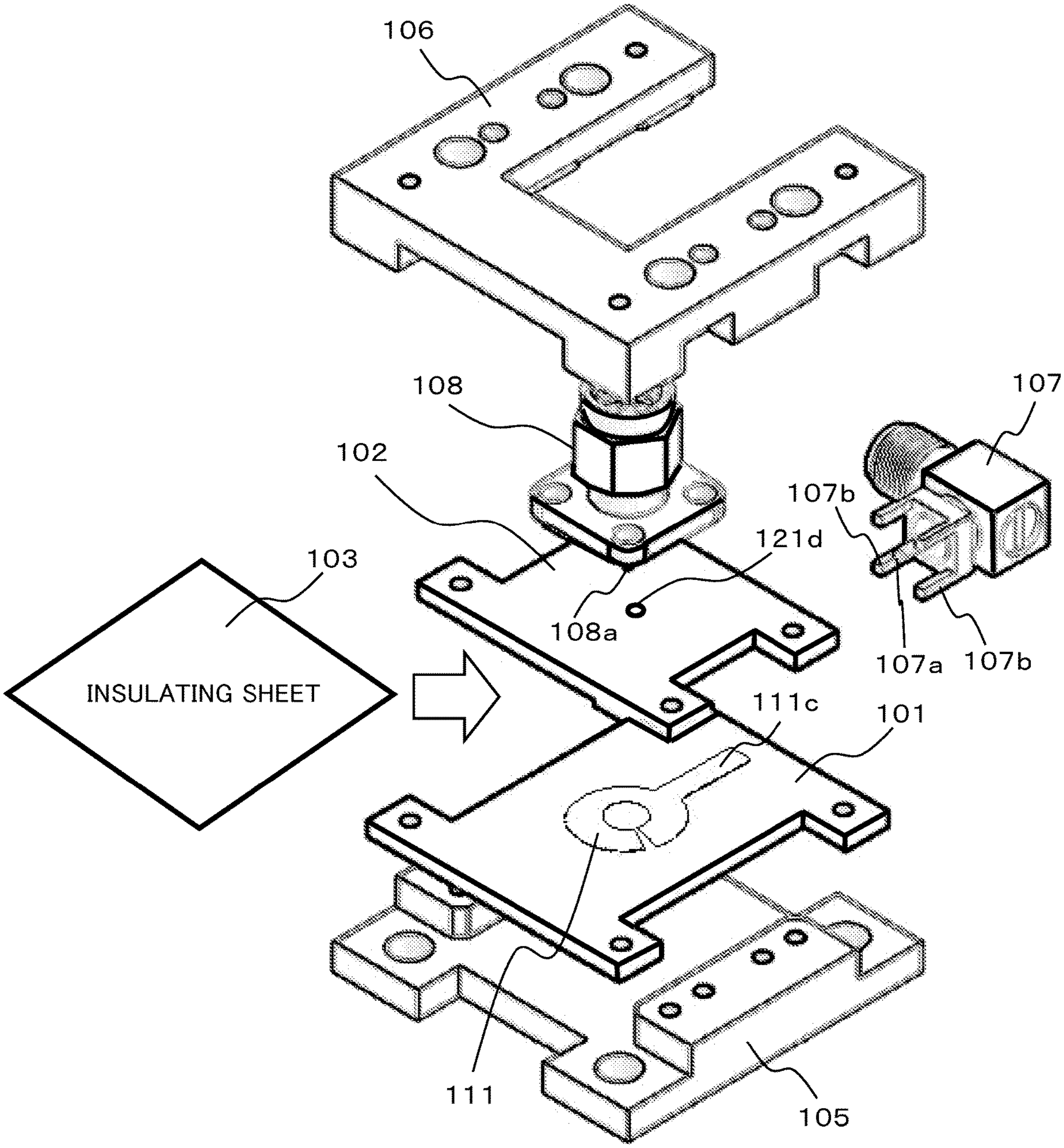
FIG. 4 is a diagram illustrating a configuration example of the DC block and its peripheral members of the present embodiment.

In the first microstrip line 101, the first high-frequency power transmission antenna 111 is connected to the inner conductor 6*a* of the downstream-side coaxial line 6 via a terminal 107 illustrated in FIG. 4, and the ground conductor layer 113 is connected to the outer conductor 6*b* of the downstream-side coaxial line 6 via the terminal 107.

In the second microstrip line 102, a through hole 124 penetrating the second high-frequency power transmission antenna 121, the dielectric layer 122, and the ground conductor layer 123 is formed. The second high-frequency power transmission antenna 121 is connected to the inner conductor 5*a* of the upstream-side coaxial line 5 via a terminal 108 in FIG. 4 connected to the through hole 124, and the ground conductor layer 123 is connected to the outer conductor 5*b* of the upstream-side coaxial line 5 via the terminal 108.

Figure 3:
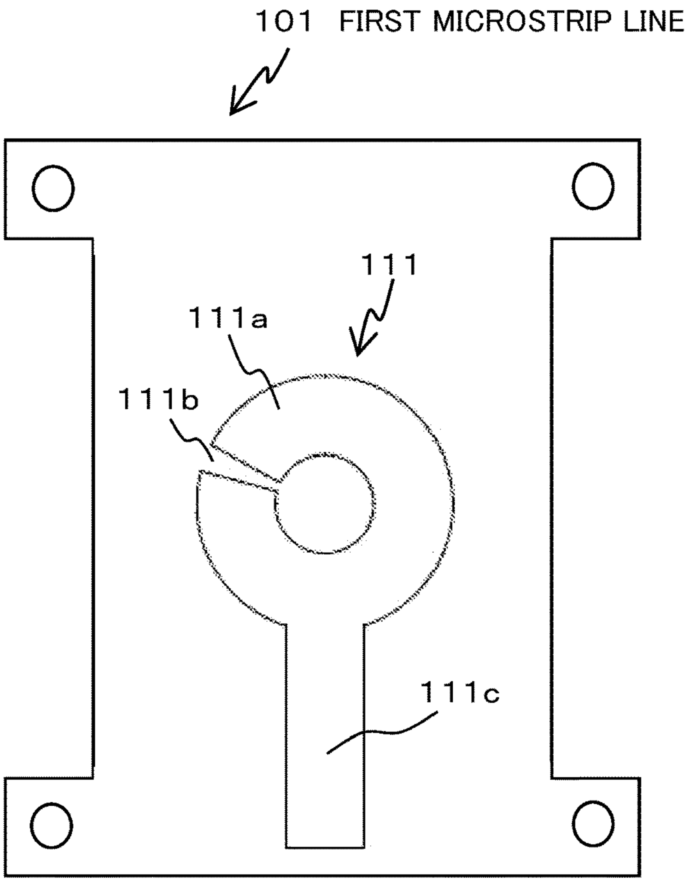
FIG. 3 is a diagram illustrating an example of a shape of a high-frequency power transmission antenna according to the present embodiment.
Figure 3:
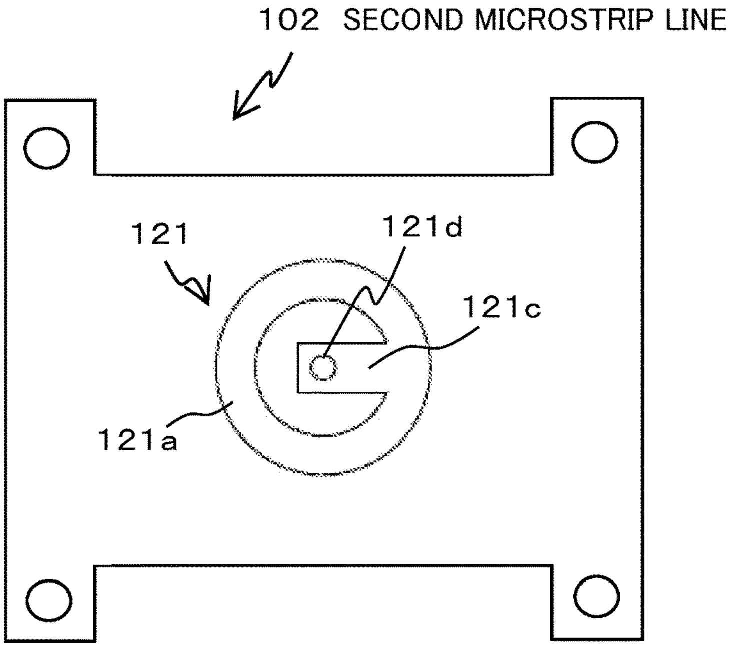

FIG. 3 is a diagram illustrating an example of a shape of the high-frequency power transmission antennas 111, 121 formed in the microstrip lines 101, 102. As illustrated in FIG. 3, the two high-frequency power transmission antennas 111, 121 have asymmetric shapes (different shapes).

The first high-frequency power transmission antenna 111 is an open ring-shaped antenna having a notch 111*b* in a part thereof. That is, the first high-frequency power transmission antenna 111 includes a ring antenna 111*a* having an open ring shape and a feeder line 111*c* connected to the inner conductor 6*a* of the downstream-side coaxial line 6. By connecting the terminal 107 illustrated in FIG. 4 to the feeder line 111*c* and passing wiring from the terminal 107 to the inner conductor 6*a* of the downstream-side coaxial line 6, the ring antenna 111*a* and the inner conductor 6*a* of the downstream-side coaxial line 6 are electrically connected. Note that the line length of the ring antenna 111*a* (the length of the line from one end portion forming the notch 111*b* to the other end portion) does not need to be an odd multiple of ½ of the wavelength of a transmission signal.

The second high-frequency power transmission antenna 121 is a closed ring-shaped antenna without a notch. That is, the second high-frequency power transmission antenna 121 includes a ring antenna 121*a* having a closed ring shape, a feeder line 121*c* connected to the inner conductor 5*a* of the upstream-side coaxial line 5, and a hole 121*d* forming a part of the through hole 124. By connecting the terminal 108 illustrated in FIG. 4 to the hole 121*d*, passing wiring from the feeder line 121*c* to the inner conductor 5*a* of the upstream-side coaxial line 5 via the through hole 124 and the terminal 108, and connecting the wiring to the feeder line 121*c* by soldering or the like, the ring antenna 121*a* and the inner conductor 5*a* of the upstream-side coaxial line 5 are electrically connected.

When the first high-frequency power transmission antenna 111 and the second high-frequency power transmission antenna 121 are disposed to face each other with the insulating sheet 103 interposed therebetween, the central axes of the ring antennas 111*a*, 121*a* are disposed on the same line. This makes it possible to strengthen the electromagnetic coupling of the ring antennas 111*a*, 121*a*.

The feeder line 111*c* of the first high-frequency power transmission antenna 111 is formed to extend from the ring antenna 111*a* toward the outside of the ring to a position near the outer edge of the first microstrip line 101. On the other hand, the feeder line 121*c* of the second high-frequency power transmission antenna 121 is formed to extend from the ring antenna 121*a* toward the inside of the ring to the center position of the second microstrip line 102.

FIG. 4 is a diagram illustrating a configuration example of the DC block 4 and its peripheral members of the present embodiment. In the DC block 4 of the present embodiment, the first microstrip line 101 is attached to a first insulating jig 105 with a screw, and the second microstrip line 102 is attached to a second insulating jig 106 with a screw. Then, the first insulating jig 105 and the second insulating jig 106 are fixed by screws.

The terminals 107, 108 are connected to the high-frequency power transmission antennas 111, 121, respectively, and high-frequency power is input and output through the terminals 107, 108. The terminal 107 is provided with one pin 107*a* at the center and four legs 107*b* at the four corners, and the first microstrip line 101 is sandwiched by the four legs 107*b*. At this time, lower two legs 107*b* are connected to the ground conductor layer 113, and the pin 107*a* at the center is connected to the feeder line 111*c* of the first high-frequency power transmission antenna 111. In addition, the terminal 108 is provided with one pin 108*a* at the center, and this is connected to the feeder line 121*c* of the second high-frequency power transmission antenna 121 by being inserted into the through hole 124 from the hole 121*d* of the second microstrip line 102, and the bottom surface portion around the pin 108*a* is connected to the ground conductor layer 123.

As described above, in the DC block 4 of the present embodiment, since the high-frequency power transmission antenna 111, 121 are formed on the two microstrip lines 101, 102, respectively, to realize transmission of high-frequency power, it is possible to reduce the size of the DC block 4 as compared with a conventional DC block using a coaxial line shape or a waveguide shape. In addition, it is possible to highly efficiently transmit only the high-frequency power while cutting off the high-voltage direct-current power by the insulating sheet 103 sandwiched between the high-frequency power transmission antennas 111, 121, which are asymmetric.

As a result, it is possible to provide the reduced-size DC block 4 compatible with a combination of high-frequency low power and high-voltage direct-current power. Here, by appropriately designing at least one of the ring width, the ring diameter, the notch position, the notch width, the number of notches of each of the ring antennas 111*a*, 121*a*, and the line width of each of the feeder lines 111*c*, 121*c*, it is possible to highly efficiently transmit only high-frequency power of a desired frequency while blocking high-voltage direct-current power of several kV class by the insulating sheet 103.

Figure 5:
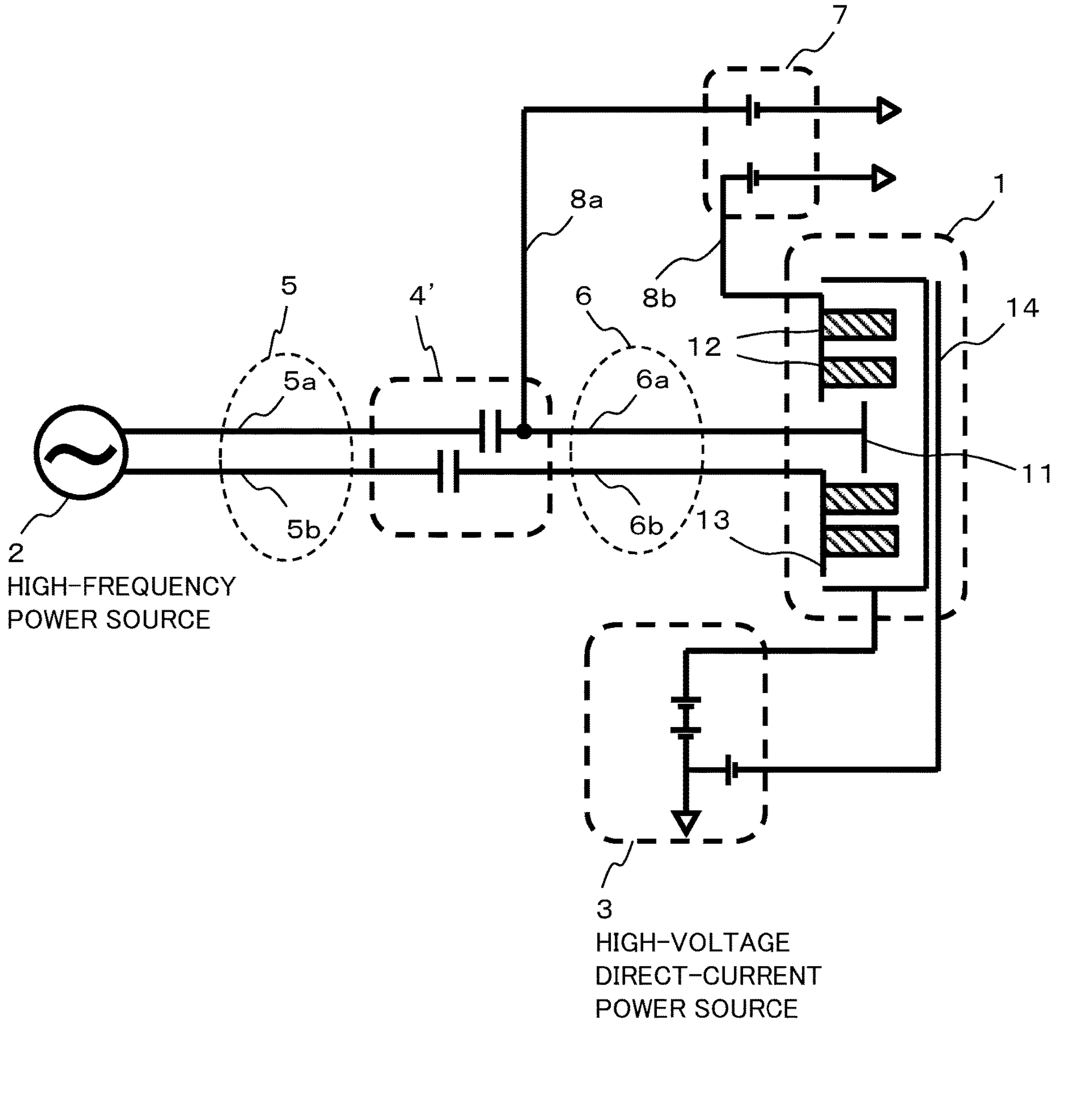
FIG. 5 is a diagram illustrating a configuration example of a plasma generator according to a first modification.

FIG. 5 is a diagram illustrating a configuration example of a plasma generator according to a first modification. In FIG. 5, the same components as those illustrated in FIG. 1 are denoted by the same reference signs. The plasma generator according to the first modification is configured to improve plasma acceleration performance by applying a voltage to the plasma generation antenna 11.

As illustrated in FIG. 5, the plasma generator according to the first modification further includes a direct-current power supply 7, and includes a DC block 4' instead of the DC block 4. The direct-current power supply 7 is a voltage application circuit for applying a direct-current voltage to the plasma generation antenna 11 connected to the inner conductor 6*a* of the downstream-side coaxial line 6. The DC block 4' is configured to draw a direct-current voltage from the first high-frequency power transmission antenna 111 connected to the inner conductor 6*a* of the downstream-side coaxial line 6 to the direct-current power supply 7.

Figure 6:
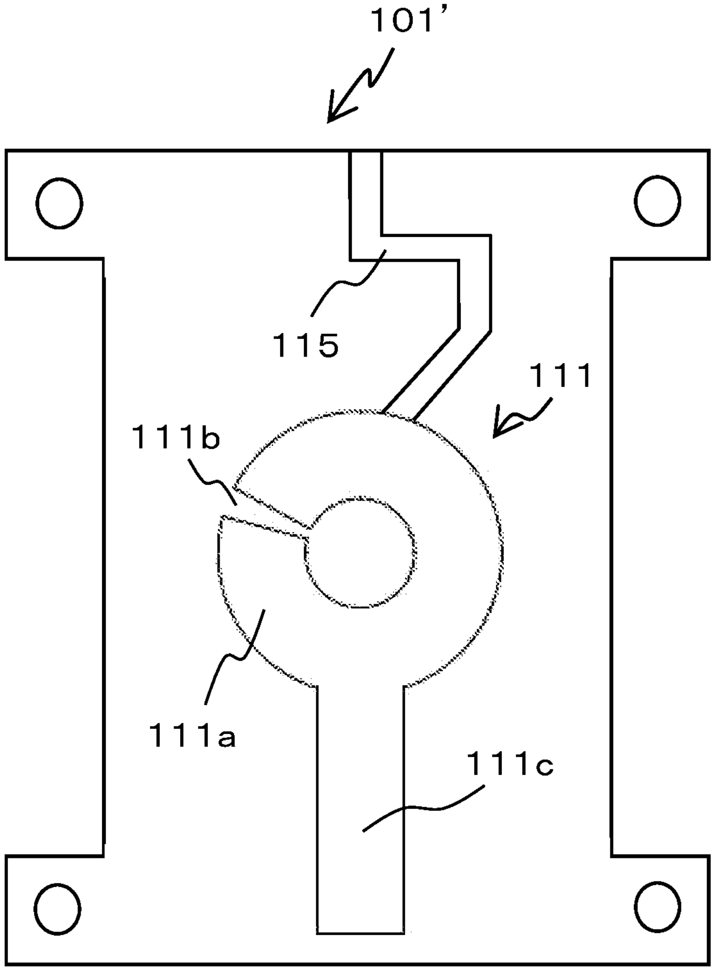
FIG. 6 is a diagram illustrating a configuration example of a first microstrip line according to the first modification.

FIG. 6 is a diagram illustrating a configuration example of a first microstrip line 101' according to a first modification. In FIG. 6, the same components as those illustrated in FIG. 3 (*a*) are denoted by the same reference signs. As illustrated in FIG. 6, on the first microstrip line 101' according to the first modification, a wiring pattern 115 for electrically connecting the first high-frequency power transmission antenna 111 and the direct-current power supply 7 is formed. The wiring pattern 115 is designed to have a line width and a length that do not affect high-frequency waves to be transmitted.

The wiring pattern 115 is electrically connected to the ring antenna 111*a* of the first high-frequency power transmission antenna 111. In addition, wiring 8*a* illustrated in FIG. 5 connects the wiring pattern 115 to the direct-current power supply 7. As a result, the direct-current power supply 7 and the plasma generation antenna 11 of the plasma generation chamber 1 are electrically connected via the wiring 8*a*, the wiring pattern 115 and the first high-frequency power transmission antenna 111 of the DC block 4', and the inner conductor 6*a* of the downstream-side coaxial line 6. In addition, the wall surface 13 of the plasma generation chamber 1 and the direct-current power supply 7 are connected by wiring 8*b*.

As a configuration for applying a voltage to the plasma generation antenna 11 of the plasma generation chamber 1, conventionally, as described in Non Patent Literature 1, a method in which a T-shaped connector and a stub tuner are disposed on the downstream-side coaxial line 6, only a core wire is taken out, and a voltage is applied has been common. However, the introduction of the T-shaped connector and the stub tuner has been a major obstacle to size reduction.

On the other hand, in the first modification, by using the wiring pattern 115 of the first microstrip line 101 and extracting a direct-current voltage from the first high-frequency power transmission antenna 111 without affecting the transmission of the high-frequency power, the application of the direct-current voltage to the plasma generation antenna 11 is realized without using the T-shaped connector and the stub tuner. Accordingly, the plasma generator can be reduced in size. This is equivalent to size reduction of the plasma generator by including the functions of the T-shaped connector and the stub tuner in the DC block 4'.

Figure 7:
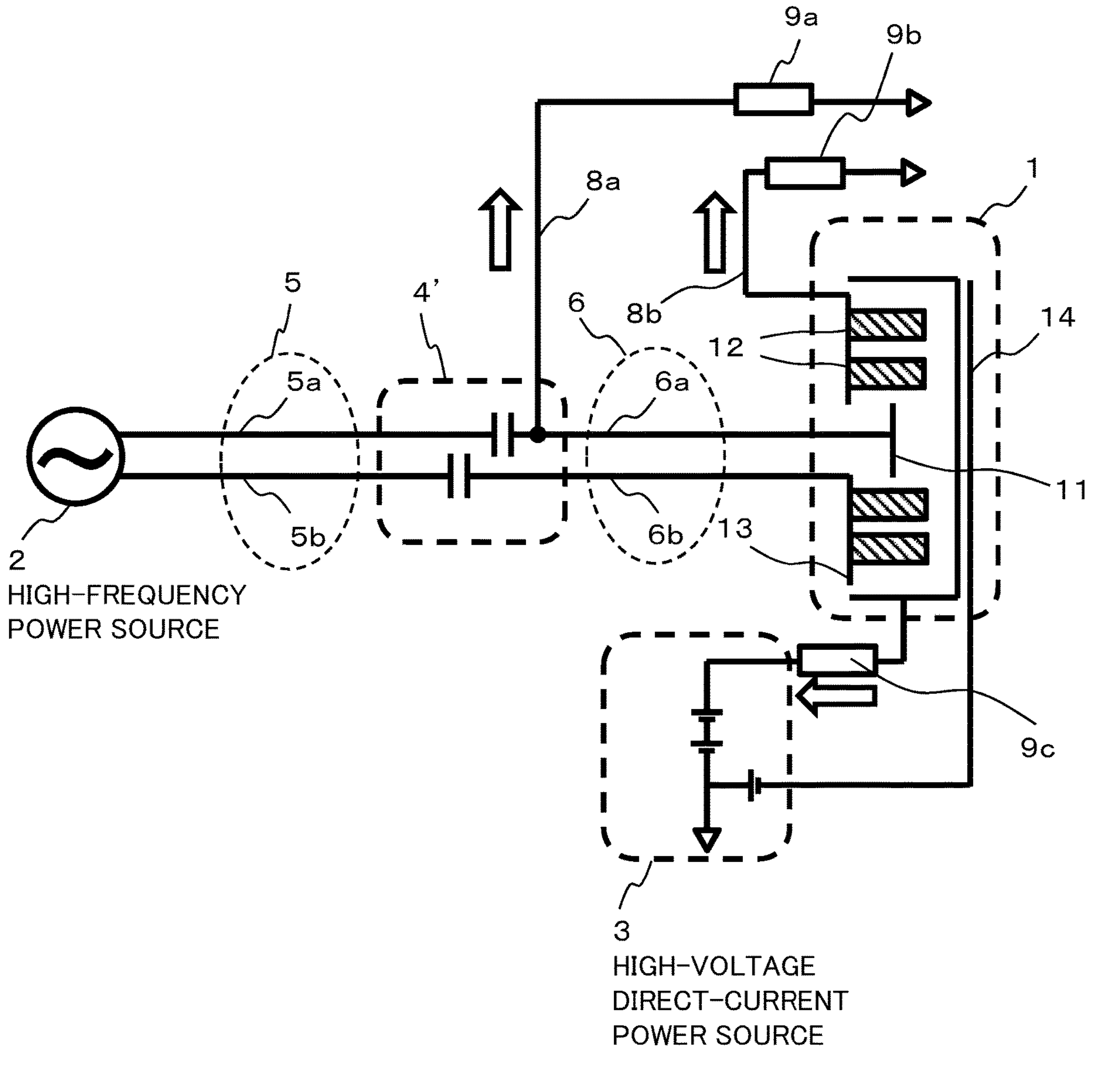
FIG. 7 is a diagram illustrating a configuration example of a plasma generator according to a second modification.

FIG. 7 is a diagram illustrating a configuration example of a plasma generator according to a second modification. In FIG. 7, the same components as those illustrated in FIG. 5 are denoted by the same reference signs. Similarly to the first modification, the plasma generator according to the second modification also improves plasma acceleration performance by applying a voltage to the plasma generation antenna 11, and is similar to FIG. 6 in that the wiring pattern 115 is formed on the first microstrip line 101'.

In the second modification, as a voltage application circuit for applying a direct-current voltage to the plasma generation antenna 11 connected to the inner conductor 6*a* of the downstream-side coaxial line 6, resistors 9*a*, 9*b* connected to a direct-current power supply (main power supply not illustrated) of the plasma generator are provided instead of the direct-current power supply 7 illustrated in FIG. 5. In the example illustrated in FIG. 7, the resistor 9*c* is also provided on the wiring connecting the high-voltage direct-current power source 3 and the wall surface 13 of the plasma generation chamber 1. Any of the resistors 9*a*, 9*b*, and 9*c* may have a value of 0Ω (no resistance).

As described above, in the second modification, the wiring 8*a* connected from the first high-frequency power transmission antenna 111 via the wiring pattern 115, and the wiring 8*b* connected from the wall surface 13 of the plasma generation chamber 1 are connected to the main power supply of the plasma generator via the plurality of resistors 9*a*, 9*b* (including 0Ω). As a result, different potentials are applied to the plasma generation antenna 11 and the wall surface 13 of the plasma generation chamber 1 using the voltage drop in the resistors 9*a*, 9*b* without using the direct-current power supply 7 of a system different from the main power supply of the plasma generator as illustrated in FIG. 5.

As a result, according to the second modification, the potential change of the plasma generation antenna 11 and the wall surface 13 of the plasma generation chamber 1 can be realized by resistance connection using the main power supply (plasma electromotive force) of the plasma generator. As a result, it is not necessary to provide the direct-current power supply 7 separately from the main power supply of the plasma generator, and the plasma generator can be reduced in size. That is, by using the resistors 9*a*, 9*b* instead of the direct-current power supply 7, it is possible to significantly reduce the size of the plasma generator and simplify the plasma generator.

Figure 8:
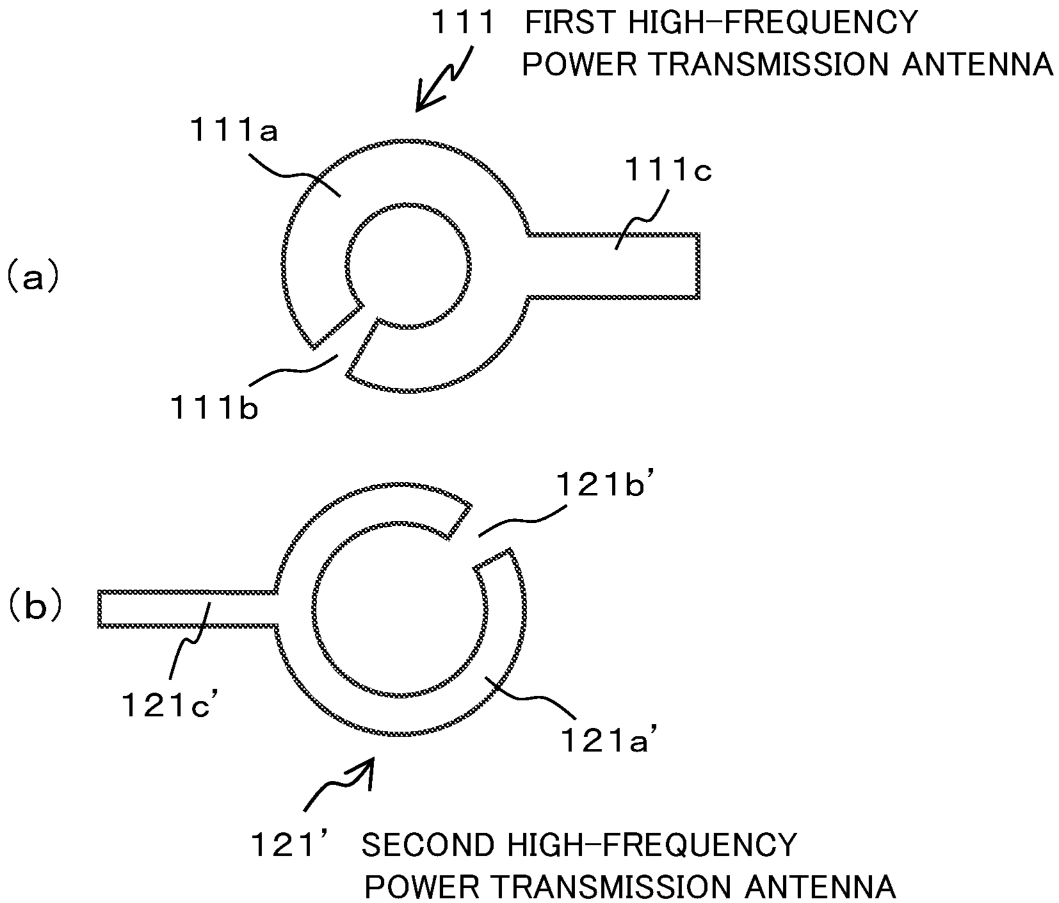
FIG. 8 is a diagram illustrating another example of a shape of the high-frequency power transmission antenna according to the present embodiment.

In the above embodiment, the example in which only the first high-frequency power transmission antenna 111 has an open ring shape has been described. However, both of the two high-frequency power transmission antennas may have the closed ring shape, or both of the two high-frequency power transmission antennas 111, 121' may have an open ring shape as illustrated in FIG. 8. At least one of the ring width, the ring diameter, the notch position, the notch width, and the number of notches of each of the two high-frequency power transmission antennas 111, 121' may be configured asymmetrically.

Forming both of the two high-frequency power transmission antennas 111, 121' in an open ring shape enables strengthening of electromagnetic coupling. At this time, by disposing the ring antennas 111*a*, 121*a'* such that the central axes thereof are on the same line and the notches 111*b*, 121*b'* are at symmetrical positions (positions shifted by 180 degrees) with respect to the central axes, it is possible to further strengthen the electromagnetic coupling of the ring antennas 111*a*, 121*a'*.

In addition, each of the above embodiments is merely an example of implementation in implementing the present invention, and the technical scope of the present invention should not be interpreted in a limited manner. That is, the present invention can be implemented in various forms without departing from the gist or main features thereof.

REFERENCE SIGNS LIST

1 Plasma generation chamber
2 High-frequency power source
3 High-voltage direct-current power source
4, 4' DC block
5, 6 Coaxial line

7 Direct-current power supply
8*a*, 8*b* Wiring
9*a*, 9*b*, 9*c* Resistor
11 Plasma generation antenna
12 Magnet
13 Wall surface
14 Accelerator grid
101, 102 Microstrip line
103 Insulating sheet
111, 121 High-frequency power transmission antenna (wiring conductor layer)
112, 122 Dielectric layer
113, 123 Ground conductor layer
114, 124 Through hole
115 Wiring pattern

The invention claimed is:

1. A DC block wherein two high- frequency power transmission antennas formed on two microstrip lines, respectively, are disposed to face each other with an insulating sheet interposed between the two high-frequency power transmission antennas, wherein at least one of the two high-frequency power transmission antennas has an open ring shape having a notch in a part thereof, and the two high-frequency power transmission antennas have asymmetric shapes.

2. The DC block according to claim 1, wherein both of the two high-frequency power transmission antennas have open ring shapes each having a notch in a part thereof, and at least one of a ring width, a ring diameter, a notch position, a notch width, and a number of notches of the open ring of each of the two high-frequency power transmission antennas, is asymmetric.

3. The DC block according to claim 1, wherein each of the microstrip lines has a layer structure including a wiring conductor layer in which the high-frequency power transmission antennas is formed, a ground conductor layer in which the high-frequency power transmission antenna is not formed, and a dielectric layer sandwiched between the wiring conductor layer and the ground conductor layer, and the two microstrip lines are disposed to face each other such that the wiring conductor layers of the two microstrip lines face each other with the insulating sheet interposed between the wiring conductor layers, and the ground conductor layers of the two microstrip lines are separated from the insulating sheet.

4. A DC block wherein two high-frequency power transmission antennas formed on two microstrip lines, respectively, are disposed to face each other with an insulating sheet interposed between the two high-frequency power transmission antennas, wherein each of the high-frequency power transmission antennas includes a feeder line connected to an inner conductor of a coaxial line that transmits high-frequency power, and on one of the microstrip lines, a wiring pattern configured to electrically connect the high-frequency power transmission antenna and a voltage application circuit configured to apply a direct-current voltage to the a plasma generation antenna connected to the inner conductor of the coaxial line is formed, the plasma generation antenna is different from the two high-frequency power transmission antennas.

5. A plasma generator comprising:

a plasma generation chamber that is a container configured to generate plasma by discharge using high-frequency power and accelerate the generated plasma by high-voltage direct-current power;

a DC block disposed on a transmission line configured to transmit the high-frequency power to the plasma generation chamber, the DC block transmitting only the high-frequency power and cutting off direct-current power, wherein the DC block has the configuration according to claim 4.

6. The plasma generator according to claim 5, wherein the plasma generator further comprises, as the voltage application circuit, a resistor connected to a direct-current power supply of the plasma generator.

7. The plasma generator according to claim 5, wherein the plasma generator further comprises a direct-current power supply as the voltage application circuit.

8. The DC block according to claim 4, wherein both of the two high-frequency power transmission antennas have open ring shapes each having a notch in a part thereof, and at least one of a ring width, a ring diameter, a notch position, a notch width, and a number of notches of the open ring of each of the two high-frequency power transmission antennas, is asymmetric.

9. The DC block according to claim 4, wherein at least one of the two high-frequency power transmission antennas has an open ring shape having a notch in a part thereof, and the two high-frequency power transmission antennas have asymmetric shapes.

10. The DC block according to claim 4, wherein each of the microstrip lines has a layer structure including a wiring conductor layer in which the high-frequency power transmission antennas is formed, a ground conductor layer in which the high-frequency power transmission antenna is not formed, and a dielectric layer sandwiched between the wiring conductor layer and the ground conductor layer, and the two microstrip lines are disposed to face each other such that the wiring conductor layers of the two microstrip lines face each other with the insulating sheet interposed between the wiring conductor layers, and the ground conductor layers of the two microstrip lines are separated from the insulating sheet.

11. A plasma generator comprising:

a plasma generation chamber that is a container configured to generate plasma by discharge using high-frequency power and accelerate the generated plasma by high-voltage direct-current power;

a DC block disposed on a transmission line configured to transmit the high-frequency power to the plasma generation chamber, the DC block transmitting only the high-frequency power and cutting off direct-current power, wherein the DC block has the configuration that two high-frequency power transmission antennas formed on two microstrip lines, respectively, are disposed to face each other with an insulating sheet interposed between the two high-frequency power transmission antennas.

12. The plasma generator according to claim 11, wherein at least one of the two high-frequency power transmission antennas has an open ring shape having a notch in a part thereof, and the two high-frequency power transmission antennas have asymmetric shapes.

13. The plasma generator according to claim 12, wherein both of the two high-frequency power transmission antennas have open ring shapes each having a notch in a part thereof, and at least one of a ring width, a ring diameter, a notch position, a notch width, and a number of notches of the open ring of each of the two high-frequency power transmission antennas, is asymmetric.

14. The plasma generator according to claim 11, wherein each of the microstrip lines has a layer structure including a wiring conductor layer in which the high-frequency power transmission antennas is formed, a ground conductor layer in which the high-frequency power transmission antenna is not formed, and a dielectric layer sandwiched between the wiring conductor layer and the ground conductor layer, and the two microstrip lines are disposed to face each other such that the wiring conductor layers of the two microstrip lines face each other with the insulating sheet interposed between the wiring conductor layers, and the ground conductor layers of the two microstrip lines are separated from the insulating sheet.

* * * * *